United States Patent [19]
Heinzman et al.

[11] 3,785,608
[45] Jan. 15, 1974

[54] JIG FOR PRECASTING A PLURALITY OF PANELS

[76] Inventors: Arthur H. Heinzman, 1433 Laburnum St., McLean, Va. 22101; Henry G. Clifton, Jr., 8955 Colesbury Pl., Fairax, Va. 22030; Robert A. Theobald, 5714 Marengo Rd., Bethesda, Md. 20016

[22] Filed: May 28, 1971

[21] Appl. No.: 147,886

[52] U.S. Cl............ 249/161, 249/163, 264/DIG. 57
[51] Int. Cl............................................... B28b 7/22
[58] Field of Search................... 249/120, 139, 160, 249/161, 129, 163; 425/88; 264/DIG. 57; 164/130

[56] References Cited
UNITED STATES PATENTS

| | | | |
|---|---|---|---|
| 937,781 | 10/1909 | Eddy..................................... | 249/18 |
| 3,488,817 | 1/1970 | Katz................................ | 249/160 X |
| 3,307,821 | 3/1967 | Torricelli............................ | 249/129 |
| 3,645,490 | 2/1972 | Beasley........................... | 249/160 X |
| 3,220,692 | 11/1965 | Eklund............................ | 249/120 X |
| 3,360,231 | 12/1967 | Van Hezik....................... | 249/129 |
| 2,725,611 | 12/1955 | Wissinger..................... | 264/DIG. 57 |
| 3,618,181 | 11/1971 | Veale............................. | 249/129 X |
| 3,075,240 | 1/1963 | Casavina........................ | 249/120 X |

Primary Examiner—Robert D. Baldwin
Attorney—Fidelman, Wolffe & Leitner

[57] ABSTRACT

A jig for precasting a multiplicity of panels, one against another, and a demountable panel precasting plant containing a multiplicity of such jigs set in succession to form a precast wall panel plant are disclosed. Each jig comprises a fixed end wall for shaping the back face of the initial panel, a movable form in which the front face and side walls are shaped and a jig base on which the movable form reciprocates.

The jig base may be a concrete slab bounded at its side edges by a pair of beams which serve as tracks for the movable form.

A row of columns alongside each side of the jig base supports a cross beam to which the movable jig may be locked at the successive locations along the jig base corresponding to successive panel thicknesses so that each jig may cast panel against panel with the back face of all panels other than the initial panel formed against the front face of the previously cast panel. The movable jig may also be locked to the tracks.

5 Claims, 14 Drawing Figures

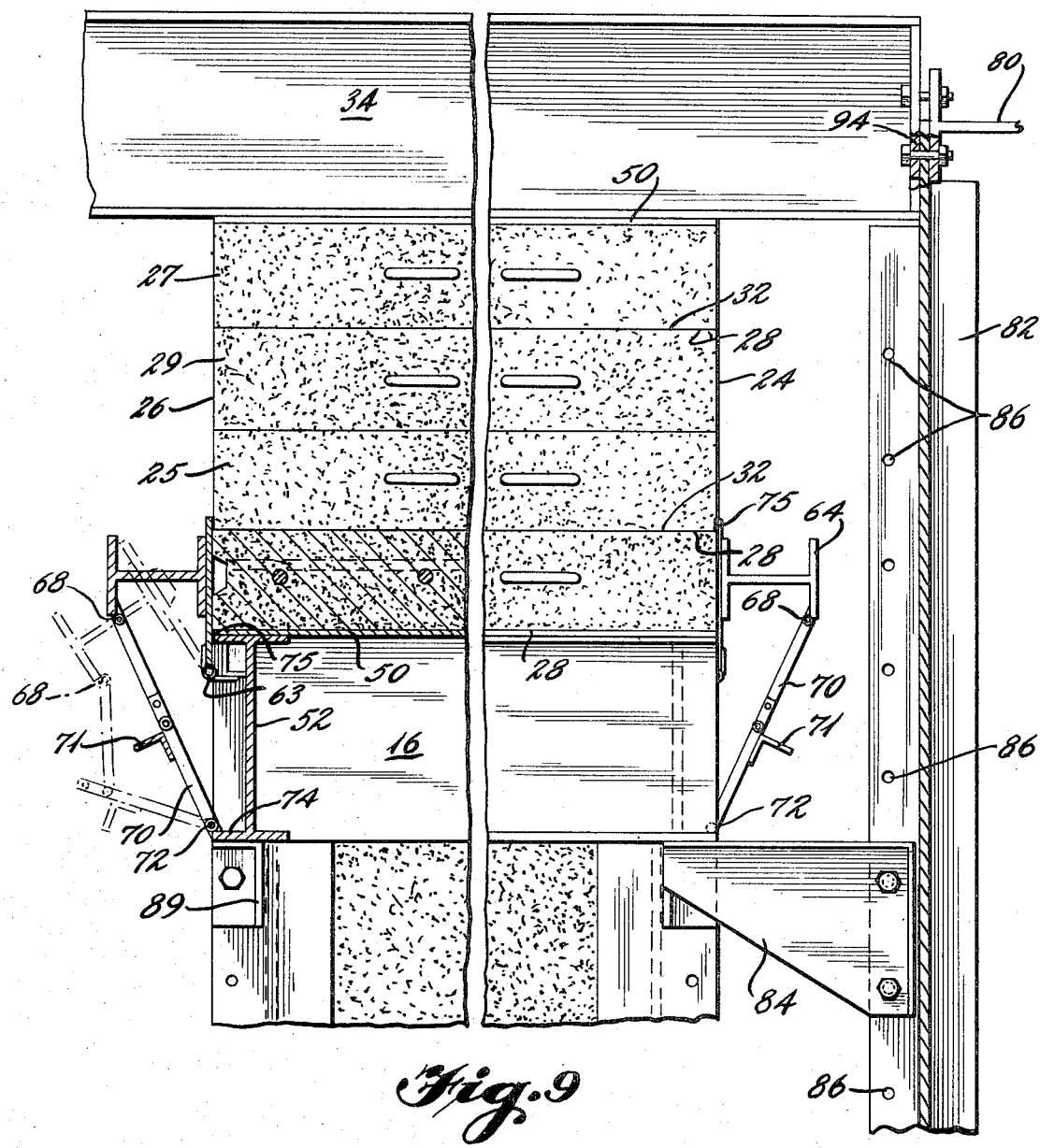
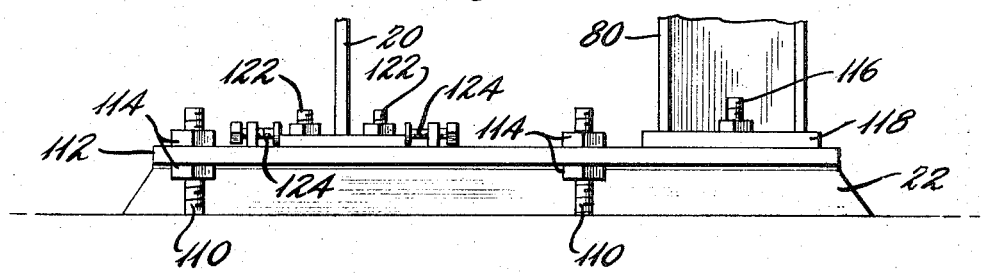

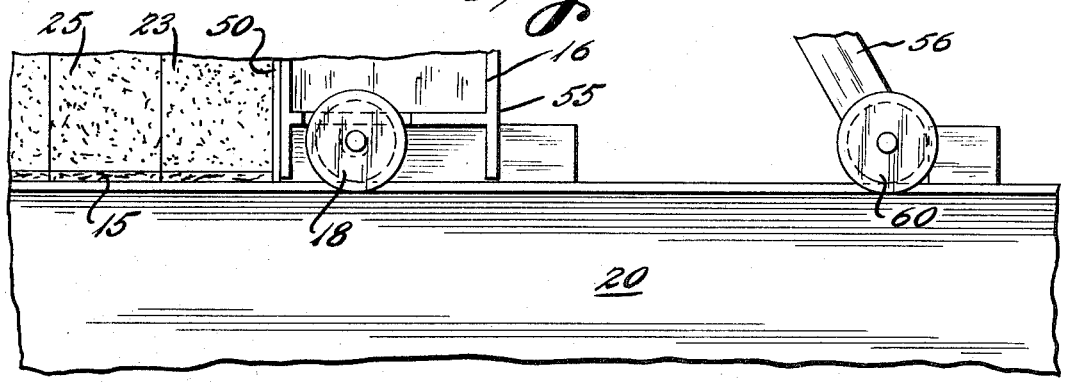
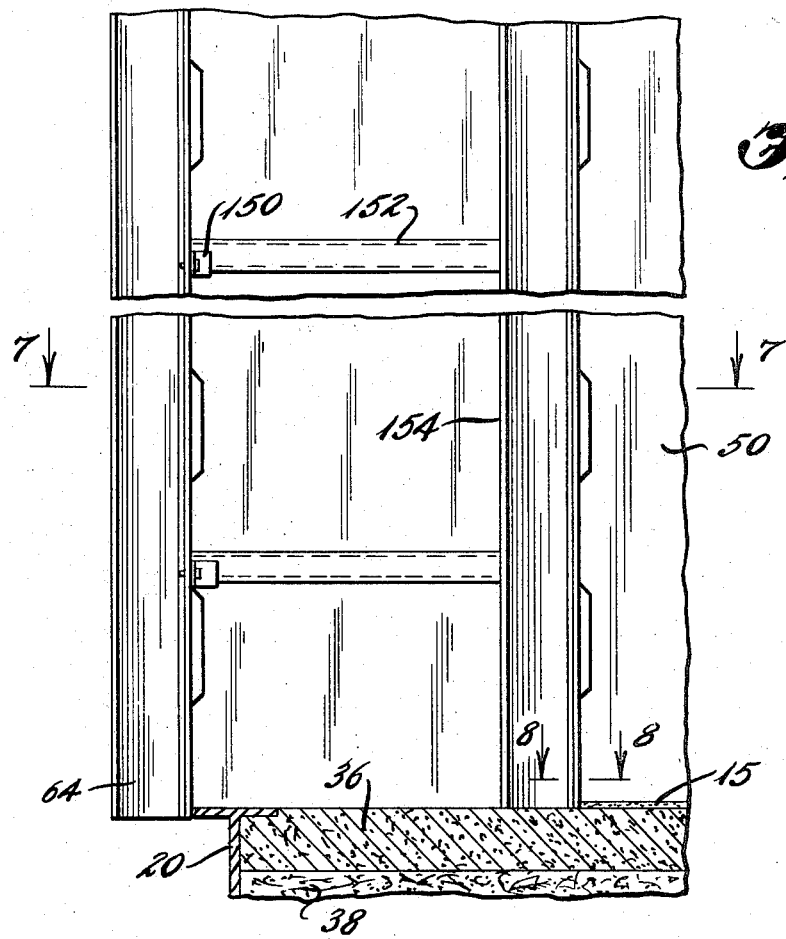
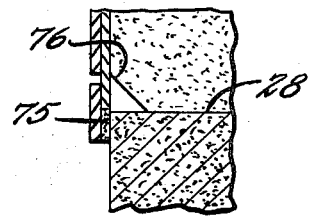
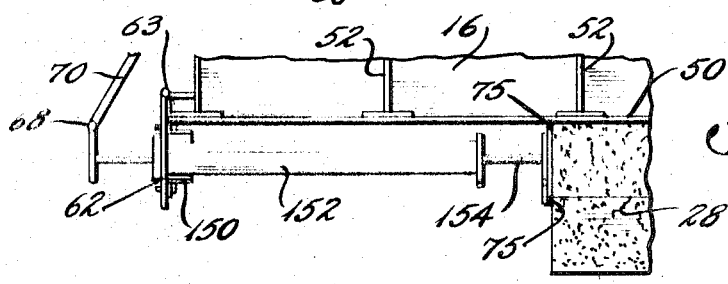

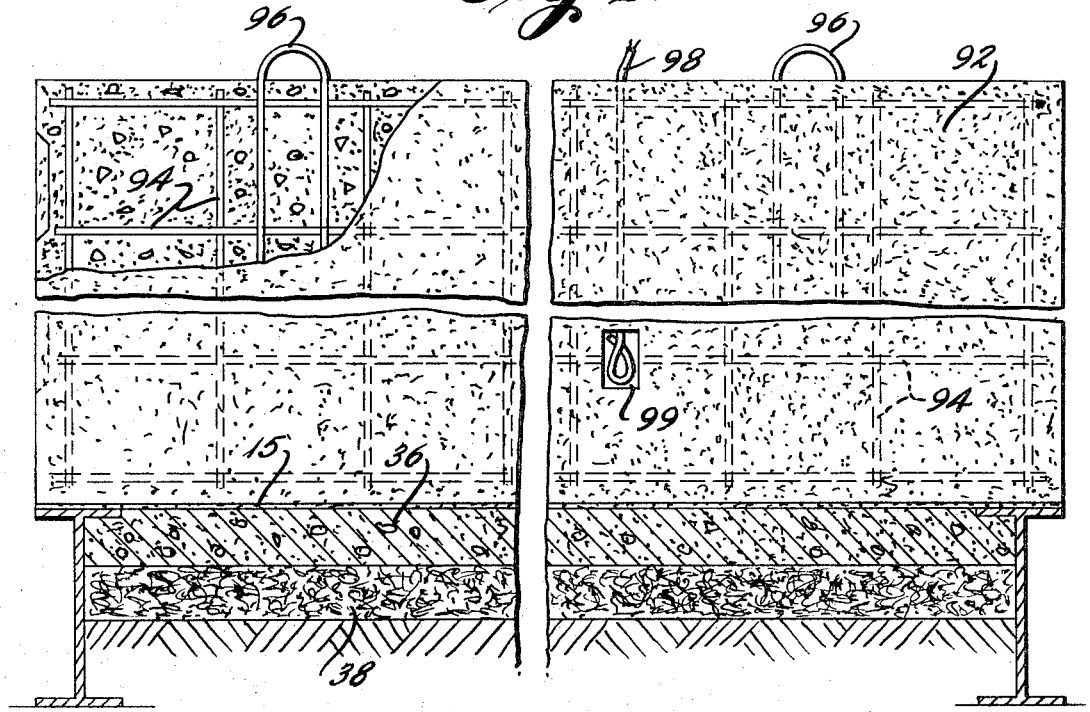
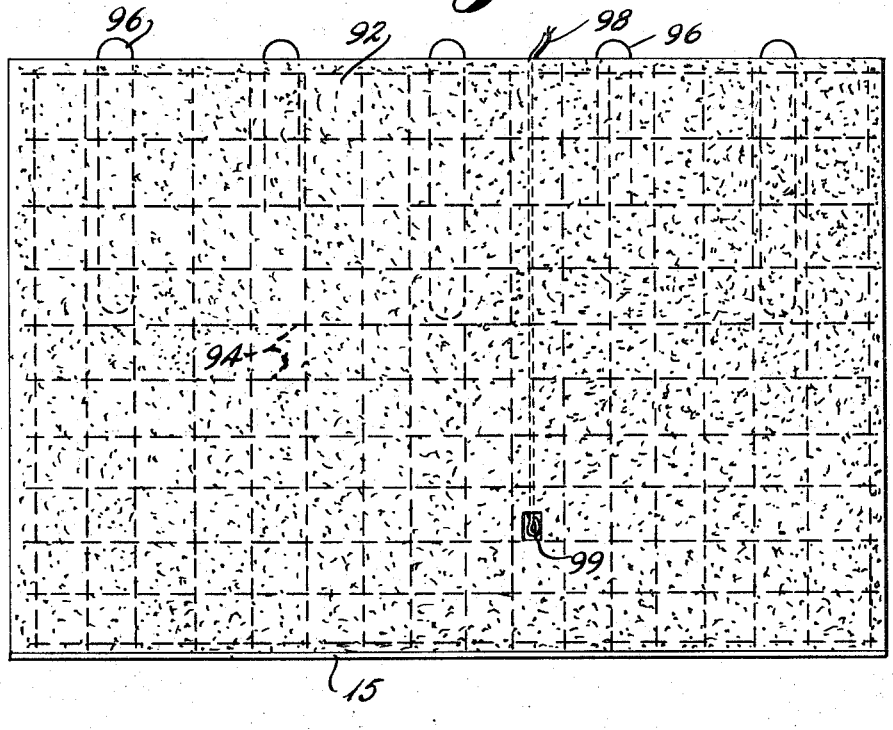
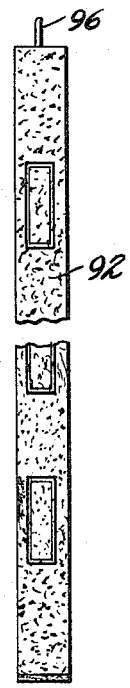

JIG FOR PRECASTING A PLURALITY OF PANELS

This invention relates to a method and apparatus for precasting load bearing walls of the sort commonly employed in multi-story reinforced concrete structures.

One classic method to construct large reinforced concrete structures involves employment of skilled carpenters to build wooden forms into which the concrete is poured, floor-by-floor, wall-by-wall, column-by-column. After the concrete at the first level has been cured, the forms are dismantled and the wood employed to build forms for the next higher level of the structure, then the concrte pouring and curing operations are repeated, and so forth. Critics have properly pointed out the extent to which this method is dependent on favorable weather, and the degree to which this method often involves excessive usage of skilled labor. Prefabrication including precasting of interior and exterior walls, has been suggested to the art as one way to substantially reduce many construction expenses and, indeed, precast building elements are commonly employed in construction.

The precast building elements may be shipped from a permanent centrally located precast plant to each construction site. An obvious alternative is to employ a demountable precast plant which, itself, can be assembled at the construction site, whenever the number of precast elements needed for a particular construction job justifies use of the demountable precast plant. Certainly, a desirable feature in any precast system would be an identity of products between precasts produced from a central permanent installation and precasts produced from a temporary on the site installation. The wall precasting plant of the present invention may be permanent or demountable.

A typical prior art wall precast plant casts the walls inside steel forms with heavy framing on five of the six wall surfaces. To shorten the cycling period, the forms may be steam or electrically heated (to accelerate cure of the concrete). Characteristically, the precast walls or panels are inventoried or stored until actually required at the job site. Unfortunately, many of the structural features which make for economic operation of a permanent precast plant are inconsistent with portability and with installation cost levels acceptable for a temporary on-the-site precast plant. For example, the usually massive forms and heavy framing of the wall casting surfaces mitigate against portability.

It has now been found that closely relating the precast plant to what can be done on the construction site, and to the minimum requirements for acceptable panels makes demountable temporary plants feasible. For example, the vertical dimension, i.e., height, of a wall panel is critical and must be held to a tight tolerance. If such is not done, problems will occur in erecting the building, e.g., additional engineering might be required to set each panel properly. On the other hand, the horizontal dimension, i.e., length, is not so critical. Minor discrepancies can be accounted for in the splice joints poured between adjacent panels at the time the panels are erected. An additional characteristic which should be considered critical is the finish on the front and rear panel faces. These should be flat, true and unblemished so that they may be painted, sprayed or have drywall glued thereto. There should be no need to grind away projections or patch honeycombing in the panel faces.

The precast plant of the present invention and the methods employed therewith are adapted to produce high quality wall panels whose vertical dimensions are quite accurate, whose side dimensions are satisfactory, and whose front and rear panel faces are flat, true and unblemished. As a whole, the precast plant is adapted to produce panels at a rate consistent with construction needs. Moreover, the precast plant may be demounted and transported from construction site to construction site, as needed.

For further understanding of the present invention, reference is now made to the attached drawings, wherein:

FIG. 4 is a section taken along lines 4—4 of FIG. 3;

FIG. 5 is a partial section taken along lines 5—5 of FIG. 3;

FIG. 6 is a partial enlarged section taken along line 6—6 of FIG. 1 showing a modified form of the wall panel casting structure;

FIG. 7 is a section taken along lines 7—7 of FIG. 6;

FIG. 8 is an enlarged partial section taken along line 8—8 of FIG. 6;

FIG. 9 is a fragmentary detail of an optional base with adjustments; and

FIG. 10 is an enlarged front view of a newly cast wall panel with parts broken away;

FIG. 11 is a front elevation of the wall panel shown in FIG. 10;

FIG. 12 is an end view of FIG. 11; and

Figure 1:
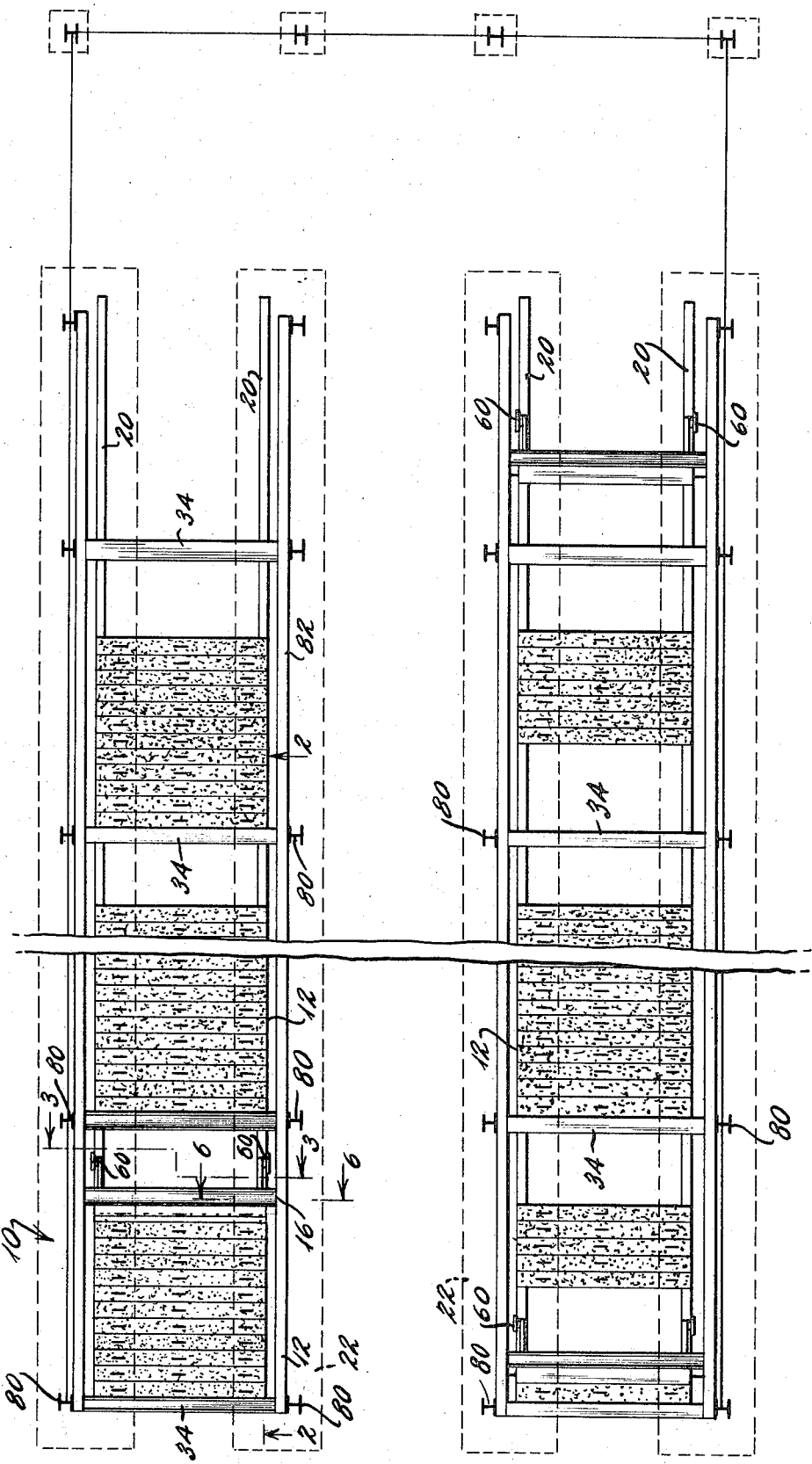
FIG. 1 is a plan view of the precast plant for forming wall panels.
Figure 2:
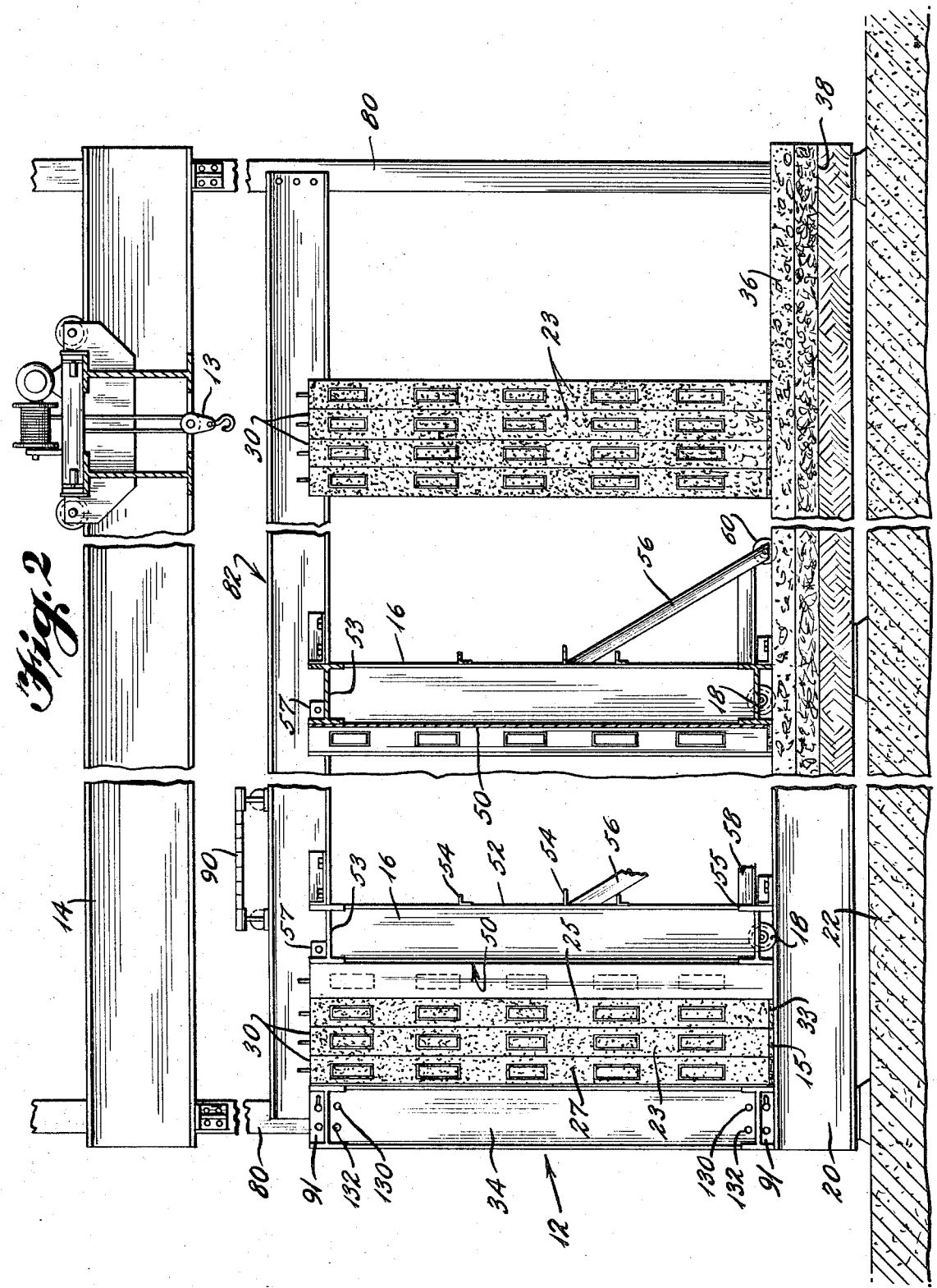
FIG. 2 is an enlarged partial side section taken along lines 2—2 of FIG. 1.

Referring now to the drawing, and, in particular, to FIGS. 1 and 2, it may be seen that the panel casting plant 10 is sizable, the plant 10, as a whole, requiring a plurality of essentially duplicate panel casting jigs 12 with a convenient number of the jigs 12, one after the other, e.g., four, eight, twelve, lined up so that a single gantry crane 13 and crane support beams 14 (FIG. 2) may be employed to service the entire group of lined-up jigs. A second line of jigs 12, such as is shown in FIG. 1, normally would be present to be serviced by the same gantry crane 13.

The principal moving member of the jig 12 consists of a heavy form 16 (of steel) mounted on wheels 18 one at each side thereof. Each wheel 18 rolls on a beam 20 which serves as a continuous track member for an entire line of jigs 12. The plant 10 rests on a set of footings 22 capable of withstanding the load imposed by the jigs, the precast panels therein and all the ancillary equipment.

As may best be seen in FIGS. 2 and 4, each jig form 16 serves to mold only three surfaces of the panel 23 cast in jig 12, namely the panel ends 24 and 26 and the forward panel face 28. The panel top 30 is left unconfined during casting being, however, carefully leveled to the top edges of form 16 using the edges as an exactly dimensioned vertical guide. The opposing rear or back panel face 32 is formed against a previously cast panel 25 as is shown in FIG. 4. In passing, it may be noted that the initial panel 27 formed in jig 12 is laid up againt (a perfectly) flat stationary wall 34. The panel bottom 33 rests on and is formed against a carefully made smooth surface concrete slab 36 which extends the length of plant 10 and serves as a jig base. A filler 15, which may be a felted fiber mat, e.g., three-eighths inch thick, with a bond breaker coated thereon is interposed between panel bottom 33 and slab 36 to prevent bleeding at the bottom of form 16. Thus, each jig 12 of precast plant 10 requires only one movable form element, i.e., form 16, and that may be a heavy-duty structure.

The first panel 27 cast in a jig 12 is cast between form 16 and the flat stationary wall 34. Once panel 27 has set, form 16 is stripped therefrom and rolled away along tracks 20. At this time, the front panel face 28 of the initial panel 27 is sprayed with a bond breaker. Then, reinforcing members and accessories, such as are hereinafter described, are placed in position for inclusion within the next panel, and filler 15 is placed at the bottom on slab 36. Thereafter, the form 16 is rolled into the position required for casting the next panel. Then the concrete is poured into form 16 from the top. The rear face 32 on panel 29 is cast against the front panel face 28 of panel 27. The cycle is repeated until form 16 has reached the end of jig 12, by which time the 20 or more panels, e.g., 6 inch panels, which constitute the total capacity of the jig will have been cast. If panel casting operates ahead of construction needs, then all the precast panels may be retained in the jig until the last cast panel sets. However, since only one or two panel castings per day will be carried out in each jig, a typical maximum jig cycling time would be as much as about 20 days, more than enough curing time for the first cast panels, i.e., panels 27, 29, 25, etc., to cure to an adequate strength level.

Accordingly, practice of the present invention contemplates removing as many as the first cast ten or dozen panels after they have cured to a reasonable strength level before the last half dozen panels are cast. Then, when form 16 has reached the end of its jig run, and is rolled forward of the last panel, form 16 may be lifted (by gantry crane 13) completely clear of the last cast wall panels and reinstalled on tracks 20 adjacent end wall 34, so that the panel-by-panel casting sequence may continue while the last cast panels are still curing in place. Operation according to this procedure results in essentially continuous use for the jig. Lifting eyes 57 can be welded to the top I-beam 53 of the form 16 so that the form may be handled by gantry crane 13 or by the portable lifting equipment usually present at construction sites.

Figure 3:
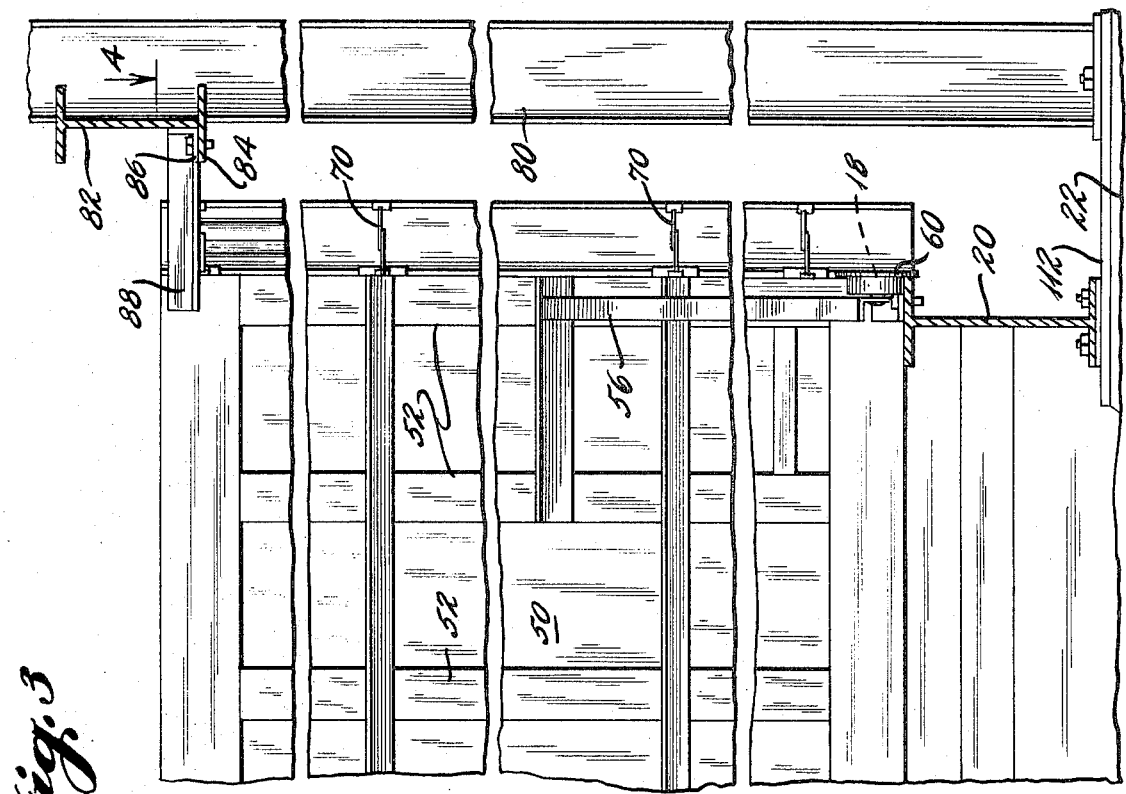
FIG. 3 is a section taken along lines 3—3 of FIG. 1.

Comment has been made that form 16 is a heavy duty structure. The drawing, notably FIGS. 2, 3 and 4, illustrate a preferred exemplary mode of form 16. A highly polished (metallic) sheet 50 whose front face comprises the concrete forming element is backed by a plurality of vertical I-beams 52 and by horzontal I-beams 53, 55 top and bottom. Elsewhere, vertical I-beams 52 are bridged by horizontal struts 54 (angles) across their rear flange faces. Form 16 is maintained upright (particularly while rolling on wheels 18) by inclined supports (angles) 56 and horizontal stays 58. Inclined support bar 56 terminates in roller 60 which rides the track beam 20.

Similarly, the stationary end wall 34 comprises a (metallic) sheet with a highly polished forming face with the obverse face reinforced by horizontal top and bottom I-beams and by bridged vertical I-beams, all exactly like the concrte forming and reinforcing structure of form 16.

An allusion has been made already as to how the horizontal dimension of the precast panels is not a critical dimension, since minor size variation panel-to-panel in this dimension can be accommodated in the splice joints formed between adjacent panels. Accordingly, the side members of form 16 may be relatively light and do not need to elaborate buttressing members required to maintain the panel side always true and accurate. As is shown in FIG. 4, the side wall forming structure comprises a hinged structure for side flap 62, flap 62 turning on a hinge 63 (which is secured to the vertical I-beam adjacent the edge of form 16). The side flap 62 is strengthened by an I-beam 64 which extends the height of side flap 62, as is shown in FIGS. 3 and 4. Thus, side flap 62 is secured to what may be considered the front flange 65 of I-beam 64. AT the edge of the back flange 66 of I-beam 64 is a second hinge 68 to which is attached toggle linkage 70. Toggle linkage 70 breaks at some midpoint thereof to pivot I-beam 64 and side flap 62 around on hinges 68 and 63. The rear end of toggle linkage 70 comprises a pivotal connection made to the outside edge of the rear flange 74 on I-beam 52, (shown in FIG. 4). Due to the extended height of side flap 62, several sets of hinges 63,68 and toggle linkage 70 are spaced apart along side flap 62, (shown in FIG. 3). A single actuating element 71 is provided to operate all toggle linkages 70 together, as a unit. A slight overthrow on toggle linkages 70 serves to lock side flap 62 in closed position. Gaskets 75 seal off the vertical corners at both edges of each side flap 62.

An important aspect of the precast plant is the non-moving structure associated with jigs 12. Referring now to FIGS. 1 and 2, it may be seen that a plurality of vertical columns 80 are positioned in rows adjacent to the jigs 12. The exterior rows of columns 80 may support a roof so that plant 10 can be under cover. As is shown in FIG. 2, the exterior rows of columns 80 also serve as the support elements for gantry crane 13 and its support beams 14. The interior rows of column 80 are short enough for crane 13 to clear. Conveniently, columns 80 may be spaced apart so that the stationary end wall 34 of each jig 12 is disposed directly between a pair of vertical columns 80 (as is illustrated in FIG. 1), with the end wall reinforcement members being secured to the columns 80 (e.g., bolted) to lock the end wall 34 in place, and to maintain same in the desired fixed vertical position. Each row of columns 80 support a cross beam 82 (I-beam) which extends the length of the lined up jigs 12. As beam 82 is positioned adjacent the top side edge of each jig 12 on each side thereof, as is shown in FIGS. 3 and 4. The lower flange 84 on cross beam 82 has a plurality of carefully spaced apart, positioning (bolt) holes 86 thereon. An upper bracket 88 with one end permanently secured, e.g., bolted or welded to the top beam 53 of form 16 is removably bolted in holes 86 to cross beam 82. Bracket 88 thereby serves to lock form 16 in place for each concrete pouring thereinto. The bolt holes 86 to which braket 88 is secured constitute spaced apart positioning elements which insure that each successive panel, e.g., panel 23, will have the proper thickness.

A locking and positioning structure is provided also at the bottom of each form 16. As can be seen in FIG. 4, the rear flange of the horizontal I-beam 55 at the bottom of form 16 has a bracket 89 welded thereto adjacent each end. Bracket 89 has at least one bolt hole therein so that it may be removably bolted to the top flange of track 20 in the spaced apart bolt holes provided therein. The bolt holes provided in upper beams 82 and lower beams 20 are positioned relative to each other and to the bolt holes in brackets 88 and 89 respectively so that when bolts are inserted therein, forms 16 will be locked at its top and bottom corners, with forming face 50 vertical and spaced from stationary wall 34 or from the last previously formed panel the correct distance for casting a wall panel of predetermined thickness. Normally, equal thickness panels are formed successively in jig 12. When the concrete of the newly cast panel has set, and form 16 is to be reset for the next panel, a necessary preliminary step is, of course, an unlocking removal of the bolts from the brackets 88 and 89.

In passing, it may be pointed out that the reinforcing structure on end wall 34 of each jig 12 can be secured either to cross beams 82 and to beams 20 or to columns 80 or to the both beams and columns.

To operate properly, producing uniform panels of predetermined dimensions, each jig 12 must be a carefully leveled, closely fitted structure. In the instance of the preferred demountable plant 10 shown in the drawing, the structural support members, i.e., columns 80 and beams 20, 82 are employed as reference elements for construction of the jigs 12. Site preparation and permanent substructure, such as footings 22, are minimal insofar as possible. The site is cleared and graded, of course, and the (four parallel) footing members 22 are cast wth anchor bolts 110 upstanding vertically therefrom. As may be seen in FIG. 9, base plates 112 on which columns 80 and beams 20 seat are bolted onto the embedded anchor bolts 110. In a preferred seating and leveling structure for a demountable plant 10 the same base plate 112 which underlies column 80 is extended to underly beam 20. A pair of nuts 114, threaded on anchor bolt 110, one on each side of the base plate 112, provide for vertical alignment of the base plate 112 and therefore column 80 and the I-beam 20. Studs 116 upstanding from the base plate 112 and an auxiliary base plate 118 serves to secure vertical column 80 to base plate 112. In the instance of beam 20 where lateral alignment may have to be adjusted as well, slotted holes are provided in the lower flange for the studs 122 which serve to secure beam 20 to base plate 112, and a set screw structure 124 permits the small degree of horizontal adjustment necessary to properly relate the position of beams 20 to jig dimensions. After base plates 112 are level on footings 22, columns 80 are erected and beam 20 installed properly spaced one from the other. Then cross-beams 82 are installed in a position which provides proper spacing of bolt holes for brackets 88 and 89.

The on-the-site nature of plant 10 should be readily apparent. The structural features of the plant permit use of removable fastening techniques (i.e., bolts). Beams 82, 20 and columns 80 can be unbolted for diassembly and removal from the construction site.

In any event, after beams 20 have been set properly spaced relative to columns 80 and with their top flanges in the proper horizontal plane, the jig area between the two beams 20 is back-filled by gravel or sand 38, then a level finely finished base or floor slab 36 is cast therebetween. Its top edge is smoothed flush with the top flange of beams 20 so that the top flange of beams 20 constitute the marginal edges of the floor slab or jig base on which panels are to be cast.

After the floor slab jig base 36 has been finished, the various other components of jigs 12 can be assembled. Thus, stationary end wall 34 and its reinforcements is hung on the columns 80 using, for example, a bracket 91 at each corner (shown in FIG. 2). In addition, the movable form 16 can now be set onto the slab 36 with wheels 18 and roller 60 riding on beams 20 to support form 16. As may be seen in FIG. 5, the bottom edge of form 16 just clears slab 36 by, for example one-eighth inch to one-fourth inch. The intent is to avoid an actual load-bearing contact between the surface of slab 36 and the bottom edges of form 16. During panel casting operations, the gap between floor 36 and form 16 is taken up by the filler (three-eighths inch thick, for example) 15 which is carefully laid in the form on top of slab 36 prior to pouring of concrete inside form 16.

Once the jigs 12 in plant 10 have been assembled in working order, panel casting operations may commence. The form 16 is rolled away from end wall 34 enough to allow workmen to place filler 15 on base slab 36 and to lay in concrete reinforcement members and whatever inserts (such as electrical conduits and junction boxes) are required in the precast panel. Thereafter, form 16 is rolled forward to its first panel casting location and secured in position by being bolted to upper brackets 88 and to lower brackets 89. The bolt holes in cross beam 82 and in lower beam 20 serve as panel positioning elements for form 16. The toggle linkages 70 may then be thrown to shift the side flaps 62 of form 16 from open position to closed position. The gaskets 75 serve to seal off the side edges of form 16 and prevent bleeding at the side edges thereof. The bottom filler strip 15 prevents bleeding at the bottom edges. Form 16 is now ready for concrete pouring thereinto, from the open top, using, for example, a hose (not shown).

The freshly poured concrete may be worked from the open top e.g., vibrated, leveled, smoothed, etc. Since the open top surface of form 16 is narrow and little panel surface is exposed, hand working is feasible and is contemplated as a preferred leveling and smoothing technique. The workmen may, of course, stand on ladders. In a preferred form construction, however, a bridging member 54 is placed at an elevation on form 16 most convenient for the workmen to stand on when leveling and smoothing the top surface of the concrete inside form 16. Shown in the drawing (FIG. 2) is a work platform 90 which rides the top flanges of cross beams 82. Platform 90 can be employed as a rolling tool holder for the workmen leveling and finishing the upper surface of the precast panels.

After the concrete of a newly cast panel has been cured to reasonable strength, side flaps 62 of form 16 are pivoted away by toggle linkages 70 and the bolts at brackets 88 and 89 removed. Then the entire form 16 is rolled back enough to allow the workmen access to the front panel face 28 of the newly cast panel. The panel face 28 is sprayed with a bond breaker and, thereafter, the workmen set up for the next panel to be cast, i.e., lay a new filler 15, set in reinforcement and other inserts, etc. In short, the panel casting operation is repeated with the second and subsequent panels being cast up against the front face 28 of the preceding panel.

It may be noted that the successive panel casting operation proceeds in each jig 12 will ultimately cause the locking and positioning bolt holes in beams 20

(used in casting the initial panels) to underlie a panel being cast inside form 16. Plugging (temporarily) the bolt hole can, of course, be one of the tasks involved in setting up for casting the next panel. If the tear strength of filler 15 is adequate to prevent rupture or even substantial deformation at the bolt hole under the weight of the wet concrete, the bolt holes may be ignored.

In due course, form 16 will have reciprocated back and forth on the jig run of base slab 36, forming panel after panel until the panel casting capacity of jig 12 reached (as, for example, twenty 6 inch panels). If time pressures are not severe, i.e., panel casting is ahead of panel needs, then form 16 may simply be left in place until the last cast panel has cured to an adequate set, e.g., 3 days. Then form 16 may be opened and rolled away from the last panel (which, under the circumstances would not be very far) and the precast panels lifted out in reverse order of casting, i.e., last first. The filler 15 may be left behind as each panel is lifted. It is top coated with a bond breaker. The filler normally is not reused and it may be removed from the bottom of the panel at any time.

If construction needs are pressing, there is no need to wait until jig 12 is full and the last panel has cured before removing the panels. Certainly, by the time a dozen panels have been cast in jig 12, the first cast panel 27 has cured sufficiently enough for removal from the jig, even for installation in the structure under construction. Accordingly, practice of the present invention explicitly contemplates removing the first cast panels from the jig while panels are still being cast near the end of the jig run. If the first cast 10 or 12 panels were removed from the jig, (e.g., by gantry crane 13) then movable form 16 may be lifted off the jig after the last cast panel has set and repositioned on slab 36 adjacent end wall 34 so that panel casting may be carried out at the beginning of the jig, while the last cast panels at the end of the jig are still curing.

Removing the first cast panel first requires some clearance between panel and end wall. Accordingly, provision has been made to permit end wall 34 to be moved slightly in order to allow the small degree of clearance required for lifting the initial panel 27 from between wall 34 and next adjacent panel 29. As is illustrated in FIG. 2, the bolts which secure the end wall brackets 91 to columns 80 are disposed in two sets of bolt holes of which one set 132 are the usual circular bolt holes, but the other set 130 constitute elongated slots which extend in the same direction as the jig run. To remove end panel 27 first, the bolts in bolt holes 132 are removed and (after loosening the bolts in slots 130) the entire structure which comprises end wall 34 may be shifted rearwardly, away from panel 27, to the extent permitted by elongated slots 130. The clearance provided thereby is adequate to allow gantry crane 13 to lift panel 27 from between end wall 34 and its adjacent panel 29. Some time thereafter, (and before a new panel 27 is cast against end wall 34) end wall 34 is returned to its normal position and bolts are once again placed in bolt holes 132 to lock the end wall in place.

The dimensions of panels cast inside the jigs 12 are fixed by the dimensions of form 16, limited flexibility exists. Certainly panels exceeding the height of form 16 cannot be precast therein nor can panels exceeding the length of jig 16 be precast therein. Similar panels can, however, be precast inside form 16 by blanking out portions of the form, e.g., side or bottom, so that lower or shorter panels are cast.

A preferred accessory contemplated for casting shorter panels is illustrated in FIGS. 6 and 8. A short cylindrical seat piece 150 is bolted or otherwise adhered to the inside face of side flap 62. A tubular end form adjustment rod 152 may be removably seated therein. The other end of rod 152 is fixed to the vertical support beam 154 for an auxiliary end or side form 156. Auxiliary end form 156, like the side flap 62, is provided with corner gaskets 75. Generally two support rods 152 will be mounted top and bottom on beam 154. Auxiliary end form 156 is employed (so that a shorter panel may be cast). It is set initially just short of the desired location so that when side flap 62 is closed, the seat 150 will engage support rod 152 forcing the adjustable end form 156 into the desired position. Support rod 152 fits in seat 150 with enough clearance to compensate for the pivotal motion of side flap 62 on opening and closing. Insert pieces 76 welded to form 156 bear against the face 28 of the previous panel to retain form 156 tight against the face of form 16.

Reference has been made repeatedly to the precast panels, e.g., panels 23, 27 with almost no elaboration on the nature of the panels or their purpose. Expressly contemplated are load bearing wall panels. An exemplary set of panels are illustrated in FIGS. 10 through 14. Reinforced concrete panel 92 cast inside form 16 has the reinforcement mat 94 (a standard welded wire reinforcement) embedded inside the concrete (as shown in FIGS. 10, 11 and 12). Also embedded inside the concrete may be electrical conduits 98, junction boxes or electrical outlets 99, preferably prewired. Lifting rings 96, which may take the form of complete rings or U bars, can be included.

Figure 13:
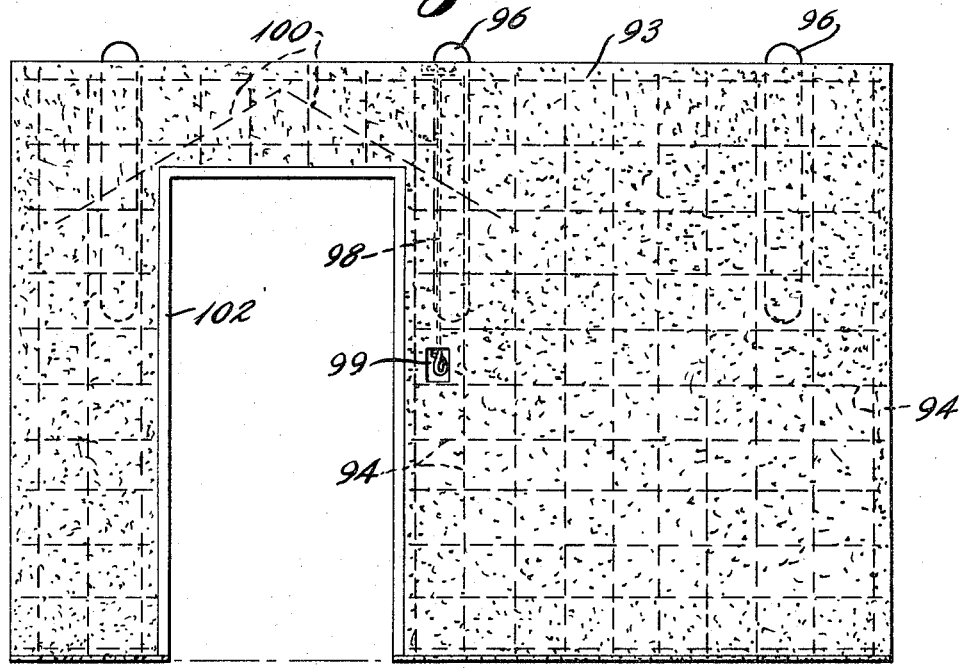
FIGS. 13 and 14 are front elevations of modified forms of precast wall panels.
Figure 14:
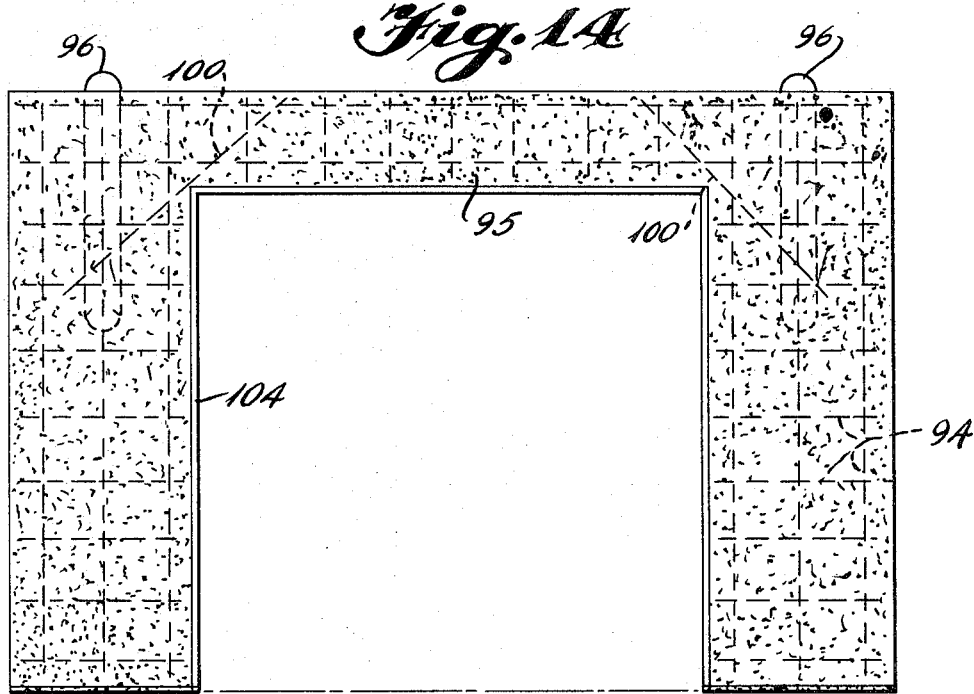

Moreover, special panels, such as the small doorway panel illustrated in FIG. 13 or the large doorway panel illustrated in FIG. 14, can be made in jigs 12. For doorway panels 93 or 95, additional reinforcing bars 100, even door bucks 102 or 104, can be placed inside the form 16 so that the final panel will have the desired door at the proper location on the panel and be adequately reinforced.

A desirable practice is to pre-assemble all inserts such as reinforcement mat 94, lifting rings 96, wiring 98, 99, etc., into a single composite insert so that the workmen handling jig 12 need only concern themselves with one unit to position in form 16 for any panel.

In describing the details of preferred modes of the present invention, many optional features not pertaining strictly to the jigs 12 have not been discussed, or illustrated and some have been illustrated in the drawing without discussion thereof. For example, the drawings illustrate indentations in the side edge surfaces of the panels. These are for keying adjacent panels together by grouting during construction. The drawings illustrate also a small degree of overlap in side flap 62 (FIG. 4) and in auxilliary end form 156. It follows that the end wall sheet 50 on form 34 is structured to allow for such overlap, so that the (first) panel 27 may be cast properly.

Normally, plant 10 would be covered by a roof (supported by the outside rows of columns 80), to shelter workmen and equipment from inclement weather. In cold climates, if a roof is not sufficient to avoid the hazards of sub-freezing temperatures, the plant could of course be enclosed by side walls and heated to prevent freezing during cold climate winter construction, or to accelerate curing of the concrete, electrical heating elements may be installed on the back side of form surfaces 50 (set among the reinforcement beams).

The plant 10 herein illustrated is adapted for temporary on-the-site installation. Forms 16 can be lifted off the jig run (e.g., by gantry crane 13). The stationary end walls 34 may be unbolted from brackets 91 then lifted, etc. Only beams 20 must be broken away from concrete, i.e., the side edges of slab 36 (see FIG. 3). Even the base plates 112 can be unbolted and removed. The anchor bolts 110 will usually be left embedded in footings 22. The removable components, like the beams, columns, forms, end walls, can be shipped as is or further disassembled to whatever degree is required for shifting to a new location. The slabs 36 might have to be broken up. Usually footings 22 will be below grade and can simply be left.

What is claimed is:

1. A jig for precasting a plurality of panels, one against another, which comprises:
   a. a fixed end wall against which the back face of the initial panel is cast;
   b. a wheeled movable form adapted to shape the panel sides and front face, the wheels being at the side edges of said movable form;
   c. a jig run on which said movable form reciprocates, said jig run comprising a continuous base slab, a portion of which serves to form the panel bottom of each successive panel;
   d. a track bounding said base slab at each side edge thereof, the wheels riding on said tracks; and
   e. means to which said movable form is locked while a panel is cast, said means further including positioning elements so that said movable form may be locked in place at successive locations along the length of said jig run coresonding to successive panel thicknesses, permitting thereby casting of panel against panel wherein the back face of all panels other than the initial panel are each formed against the front face of the next previously cast panel.

2. A jig for precasting a plurality of panels, one against another, which comprises:
   a. a fixed end wall against which the back face of the initial panel is cast;
   b. a movable form adapted to shape the panel sides and front face;
   c. a jig run on which said movable form reciprocates, said jig run comprising a continuous base slab, a portion of which serves to form the panel bottom of each successive panel;
   d. means to which said movable form is locked while a panel is cast, said means further including positioning elements so that said movable form may be locked in place at successive locations along the length of said jig run corresponding to successive panel thicknesses, permitting thereby casting of panel against panel wherein the back face of all panels other than the initial panel are each formed against the front face of the next previously cast panel; and
   e. a beam bounding said jig run at each side edge thereof, each said beam including thereon spaced apart locking and positioning elements which constitute at least a portion of the locking and positioning structure which secures said movable form when casting panel against panel.

3. A jig for precasting a plurality of panels, one against another, which comprises:
   a. a fixed end wall against which the back face of the initial panel is cast;
   b. a movable form adapted to shape the panel sides and front face;
   c. a jig run on which said movable form reciprocates, said jig run comprising a continuous base slab, a portion of which serves to form the panel bottom of each successive panel,
   d. means to which said movable form is locked while a panel is cast, said means further including positioning elements so that said movable form may be locked in place at successive locations along the length of said jig run corresponding to successive panel thicknesses, permitting thereby casting of panel against panel wherein the back face of all panels other than the initial panel are each formed against the front face of the next previously cast panel; and
   e. upstanding columns spaced apart the length of said jig run on each side thereof, a cross beam supported by said columns above and to the side of said movable form extending about the length of said jig run, one on each side thereof, each said cross beam having thereon spaced apart locking and positioning elements which constitute at least a portion of the locking and positioning structure which secure said movable form when casting panel against panel.

4. The jig of claim 3 wherein a multiplicity of such jigs are disposed in line and the same cross beams serve the plurality of jigs.

5. A jig for precasting a plurality of panels, one against another, which comprises:
   a. a fixed end wall against which the back face of the initial panel is cast;
   b. a movable form adapted to shape the panel sides and front face, said movable form including an auxiliary removable side forming means blocking off a side portion of said movable form braced against one of the side flaps of said movable form when in closed position, whereby a shortened panel is cast inside said movable form;
   c. a jig run on which said movable form reciprocates, said jig run comprising a continuous base slab, a portion of which serves to form the panel bottom of each successive panel, the front and side panel forming surfaces of said movable form clearing the base slab, the clearance so provided being sealable by interposition of a filler sheet between the slab and the panel cast inside said movable form; and
   d. means to which said movable form is locked while a panel is cast, said means further including positioning elements so that said movable form may be locked in place at successive locations along the length of said jig run corresponding to successive panel thicknesses, permitting thereby casting of panel against panel wherein the back face of all panels other than the initial panel are each formed against the front face of the next previously cast panel.

* * * * *